June 12, 1962 A. DREISIN 3,038,456

SELF-LOCKING NOZZLE GASKET

Filed Jan. 27, 1961

Inventor
Alexander Dreisin
By Charles L. Schwab
Attorney

United States Patent Office 3,038,456
Patented June 12, 1962

3,038,456
SELF-LOCKING NOZZLE GASKET
Alexander Dreisin, Homewood, Ill., assignor to Allis-Chalmers Manufacturing Company, Milwaukee, Wis.
Filed Jan. 27, 1961, Ser. No. 85,334
5 Claims. (Cl. 123—32)

This invention relates to a gasket for a fuel injection nozzle.

Heretofore gaskets have been employed between fuel injection nozzles and the cylinder head of an engine to prevent escape of gases from the combustion chamber. When the nozzle is removed for replacement or repair, the gasket often remains in its installed position inasmuch as the gasket is not fixedly secured to the nozzle. The serviceman may not remember that the nozzle gasket has not been removed from its installed position and install an additional gasket with the repaired or replacement nozzle. When this occurs the spray orifices of the nozzle are at a different position in relation to the combustion chamber from that desired and inefficient combustion results.

It is common practice when replacing the nozzle to also replace the gasket, and if the gasket remains in a cylinder head, the repairman must fish the gasket out separately. This consumes time and results in delay in the repairs as well as additional expense for time expended.

It is an object of this invention to provide a fuel injection nozzle gasket which is deformed during installation to lock itself to the nozzle so that the gasket is withdrawn when the nozzle is withdrawn from its installed position.

It is a further object of this invention to provide a dish-shaped washerlike gasket with a plurality of prongs which engage the nozzle upon the gasket being flattened during installation.

It is a further object of this invention to provide a nozzle gasket which locks itself to the nozzle upon installation of the nozzle and gasket and which is usable with standard existing nozzles and engines, without alteration of the nozzle or engine.

It is a further object of this invention to provide a dish shaped nozzle gasket of a material which is permanently deformed under the usual nozzle hold-down pressures to a flattened condition wherein its diameter is in gripping engagement with the nozzle.

It is a further object of this invention to provide a self-locking nozzle gasket which is simple in design, economical to manufacture and gives satisfactory service.

These and other objects of this invention will become apparent upon a reading of the following description in conjunction with the drawings in which.

Figure 1:
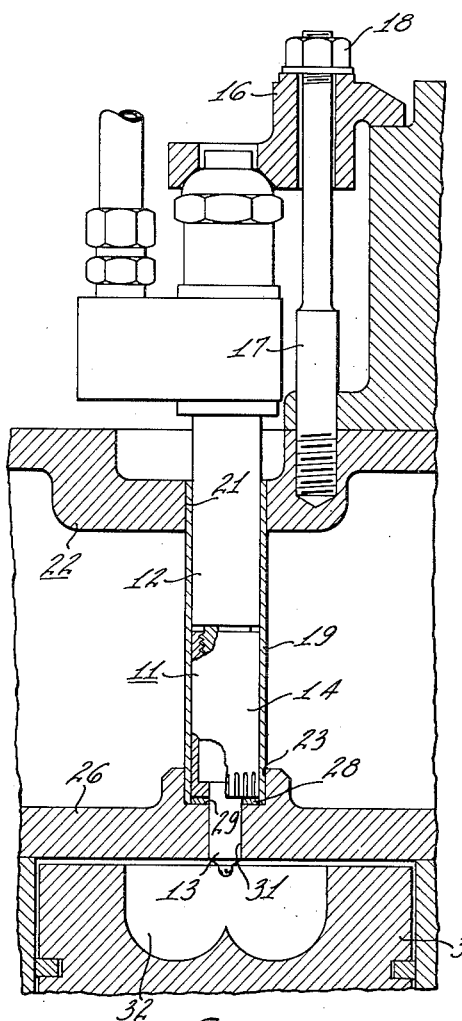
FIG. 1 is a section through the engine in which this invention may be incorporated showing a nozzle and gasket.

Referring to FIG. 1, a portion of an internal combustion engine of the compression ignition type is shown in which a fuel injection nozzle holder assembly is shown in an installed position. The fuel injection nozzle holder assembly 11 includes a nozzle holder body 12, a nozzle 13 and a nozzle nut 14. The nozzle holder assembly is conventional in construction and is held in installed position by a clamp 16, stud 17 and nut 18. The nozzle holder body 12 and nozzle nut have a loose fit within an injection nozzle sleeve 19. The injection nozzle sleeve is press fitted into an upper bore 21 of the cylinder head 22 and a counterbore 23 in a lower wall 26 of the cylinder head 22. The nozzle 13 has a loose fit within bore 31 of cylinder head wall 26. A nozzle gasket 28 is installed between the nozzle nut 14 and the flat bottom portion 29 of the counterbore. As is conventional, the tip of the nozzle extends below the cylinder head into the combustion chamber 32 between the piston 33 and the cylinder head.

Figure 6:
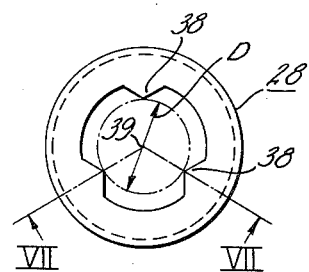
FIG. 6 is a top view of the gasket.
Figure 7:
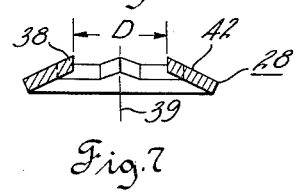
FIG. 7 is a section of the gasket along the line VII—VII of FIG. 6.

Referring to FIGS. 6 and 7 the gasket 28 is shown in greater detail. The gasket is of a washerlike configuration and is made of soft copper. Extending inwardly from the center of the gasket are three prongs 38, the tips of which define a circle concentric with the center axis 39 of the gasket. The circle has a diameter D in its nondeformed condition, as illustrated in FIGS. 6 and 7, which is slightly greater than the diameter E of the nozzle as indicated in FIG. 2.

Figures 2, 3:
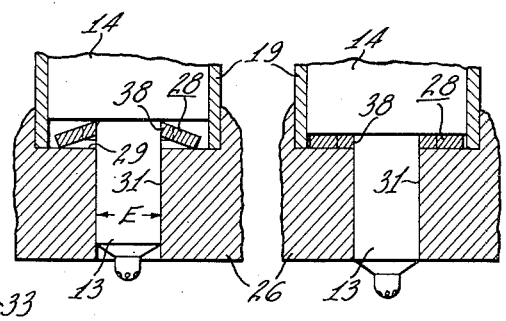
FIG. 2 is an enlarged section of the lower part of the nozzle and bottom part of the cylinder head showing the locking gasket before it is deformed to its installed position.
FIG. 3 is similar to the showing of FIG. 2 showing the gasket in the installed position.

Referring to FIG. 2, the gasket 28 is shown in position preparatory to tightening of the nut 18. Since the diameter D of the gasket is greater than the diameter E, the gasket is freely installed on nozzle 13. The crown side 42 of the nozzle gasket is preferably placed toward the nozzle nut 14.

Referring to FIG. 3, the nozzle assembly has been tightened into place by the tightening nut 18 with 21 to 24 pound feet of torque, this being the usual amount of torque employed for the type of nozzle installation illustrated. In this condition, the gasket has been permanently deformed, the elastic limit of the copper gasket has been exceeded by the force to which it is subjected, and the prongs 38 are now in gripping engagement with the nozzle 13. Upon removal of the nozzle assembly, the gasket will cling to the nozzle and be removed therewith, thus avoiding accidentally leaving the nozzle gasket in the counterbore.

Figures 4, 5:
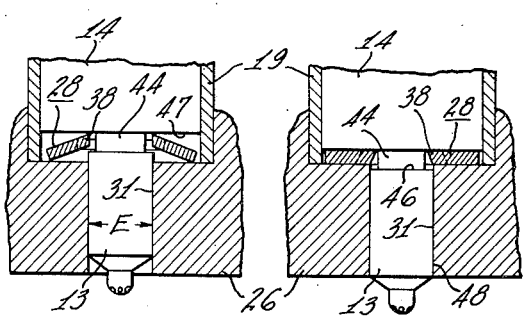
FIG. 4 shows an embodiment of the invention wherein a recessed portion is cut in the nozzle and the gasket is in its nondeformed condition.
FIG. 5 shows the embodiment of FIG. 4 with the nozzle in an installed position and the gasket deformed.

Referring to FIGS. 4 and 5, a second embodiment of this invention is illustrated. It may be desirable in some instances to provide a more positive connection between the gasket and the nozzle and in the embodiment of FIGS. 4 and 5 a portion 44 of decreased diameter if provided on the nozzle 13 adjacent the shoulder 47 presented by nozzle nut 14. FIG. 4 illustrates the gasket and nozzle holder assembly in position preparatory to tightening nut 18. FIG. 5 shows the arrangement of FIG. 4 in an installed condition. As illustrated the prongs 38 of the nozzle gasket have been contracted inwardly upon deformation of the gasket 28 to the position shown in FIG. 5. Since the elastic limit of the copper has been exceeded, the gasket is permanently flattened. Thus when the nozzle assembly of FIG. 5 is removed from its installed position, the prongs 38 will lockingly engage the nozzle through their engagement with a ledge 46 between the portion 44 of decreased diameter and the portion of the nozzle with the diameter E formed by cylindrical surface 48.

From the foregoing description it is evident that applicant has provided an extremely novel self-locking gasket for a fuel injector nozzle. This nozzle gasket is simple in construction, lends itself to mass production, is inexpensive, may be used with standard nozzles and solves a long standing service problem.

Other modifications of this invention would be obvious to those familiar with the art and it is not intended to limit the scope of this invention except as necessitated by the appended claims.

What is claimed is:

1. In an internal combustion engine of the compression ignition type having a cylinder head, the combination comprising: a bore in said cylinder head opening into the cylinder of said engine, a counterbore of larger diameter concentric with said bore and disposed on the side of the latter remote from said cylinder, a radially extending seating surface between said bores, a nozzle holder assembly in said counterbore having a nozzle extending through said bore and a portion of increased diameter in confronting relation to said seating surface, an annular deformable metal sealing gasket between said nozzle holder assembly and said seating surface, said gasket being of smaller outside diameter than said counterbore and greater interior diameter than said nozzle in its non-installed condition, said gasket being dish shaped with the crown of said gasket in confronting relation to said nozzle holder assembly during installation, and upon deformation of said gasket to a flat installed condition, said interior diameter of said gasket being decreased sufficiently to cause said gasket to grippingly engage said nozzle, whereby said gasket will be withdrawn from the cylinder head when said injection nozzle holder assembly is withdrawn.

2. In an internal combustion engine of the compression ignition type having a cylinder head, the combination comprising: a bore in said cylinder head opening into the cylinder of said engine, a radially extending seating surface on said head at the end of said bore remote from said cylinder, a nozzle holder assembly having a shoulder in confronting relation to said seating surface and a nozzle extending through said bore, and an annular deformable sealing gasket between said nozzle holder assembly and said seating surface having a center opening through which said nozzle projects, said gasket having a dish shaped body portion in its noninstalled condition and a plurality of prongs projecting radially inward into said center opening, said gasket being deformable under nozzle hold-down pressure to a permanently flattened condition in which said prongs lockingly engage said nozzle whereby said gasket becomes removable with said nozzle holder assembly.

3. In an internal combustion engine of the compression ignition type having a cylinder head, the combination comprising: a bore in said cylinder head opening into the cylinder of said engine, a radially extending seating surface on said head at the end of said bore remote from said cylinder, a nozzle holder assembly having a shoulder in confronting relation to said seating surface and a nozzle extending through said bore, and an annular deformable sealing gasket between said nozzle holder assembly and said seating surface including a dish shaped body portion in its noninstalled condition with a center opening through which said nozzle projects and at least three prongs projecting radially inward into said center opening to encompass said nozzle, said gasket when installed being deformed to a flattened condition in which said prongs engage said nozzle and thus becomes removable with said nozzle holder assembly.

4. In an internal combustion engine of the compression ignition type having a cylinder head, the combination comprising: a bore in said cylinder head opening into the cylinder of said engine, a radially extending seating surface on said head at the end of said bore remote from said cylinder, a nozzle holder assembly having a shoulder in confronting relation to said seating surface and a nozzle extending through said bore, and an annular deformable metal sealing gasket encircling said nozzle and disposed between said nozzle holder assembly and said seating surface, said gasket in its noninstalled condition freely slidable onto said nozzle, and said gasket when installed being deformed so a permanently flattened condition of reduced axial dimension in which its inner diameter contracts sufficiently to cause said gasket to grippingly engage said nozzle thereby maintaining said gasket and nozzle in an assembled condition.

5. In combination with an internal combustion engine of the compression ignition type having a bore in the cylinder head opening into the cylinder of said engine, a radially extending seating surface on the head at the end of the bore remote from the cylinder, and a nozzle holder assembly having a shoulder in confronting relation to the seating surface and a nozzle extending through the bore, a self-locking gasket between said nozzle holder assembly and said seating surface including a body portion which in its noninstalled condition is dish shaped, a center opening through which said nozzle projects and at least three prongs projecting radially inward into said center opening to encompass said nozzle, said gasket being deformed when installed to a flattened condition in which said prongs lockingly engage said nozzle.

References Cited in the file of this patent

UNITED STATES PATENTS

| | | |
|---|---|---|
| 2,761,347 | McKee | Sept. 4, 1956 |
| 2,818,840 | McGowen | Jan. 7, 1958 |